March 7, 1950  E. J. RIES ET AL  2,500,095
EQUIPMENT STAND
Filed March 14, 1945  10 Sheets-Sheet 1
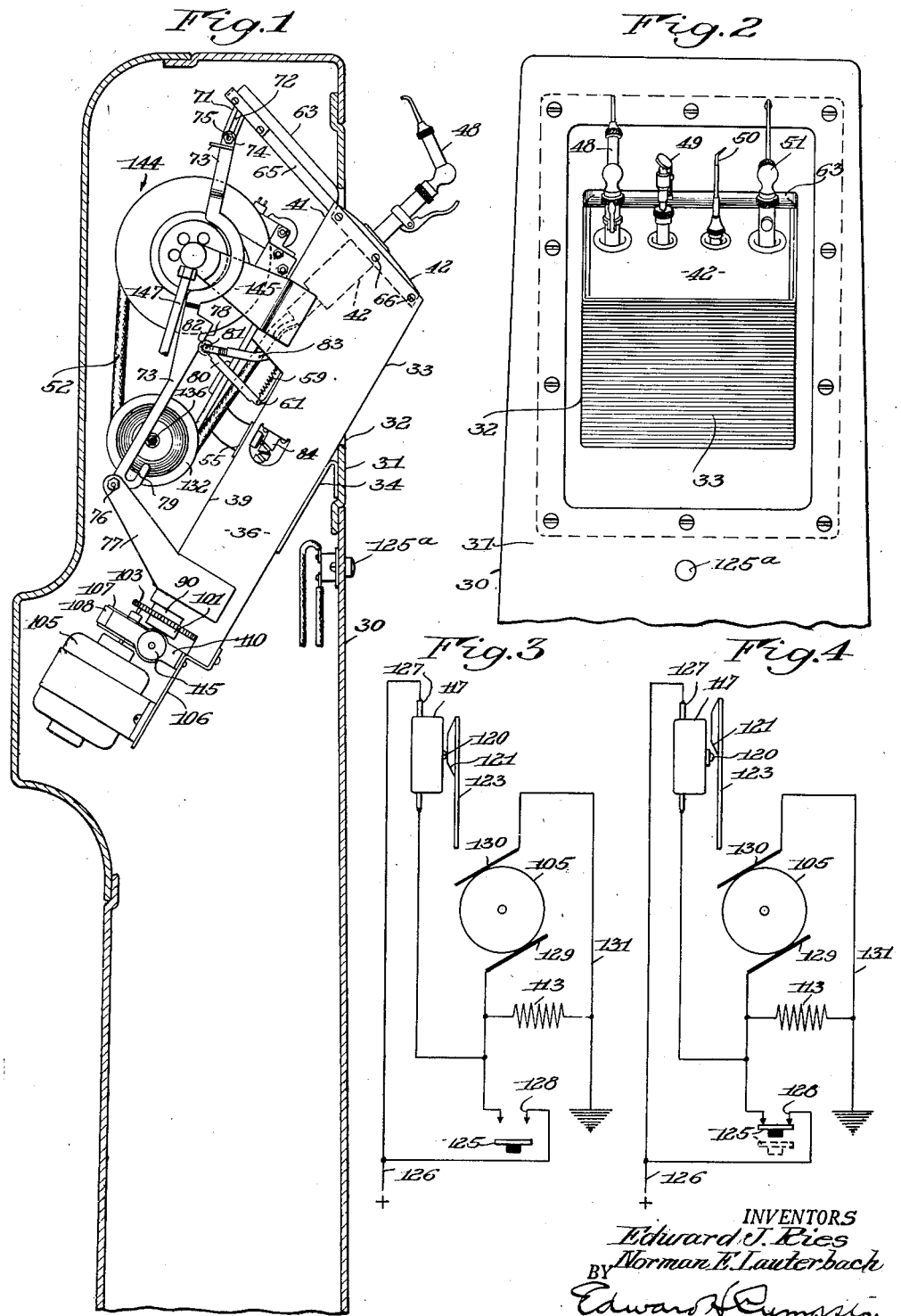

March 7, 1950 E. J. RIES ET AL 2,500,095
EQUIPMENT STAND
Filed March 14, 1945 10 Sheets-Sheet 2
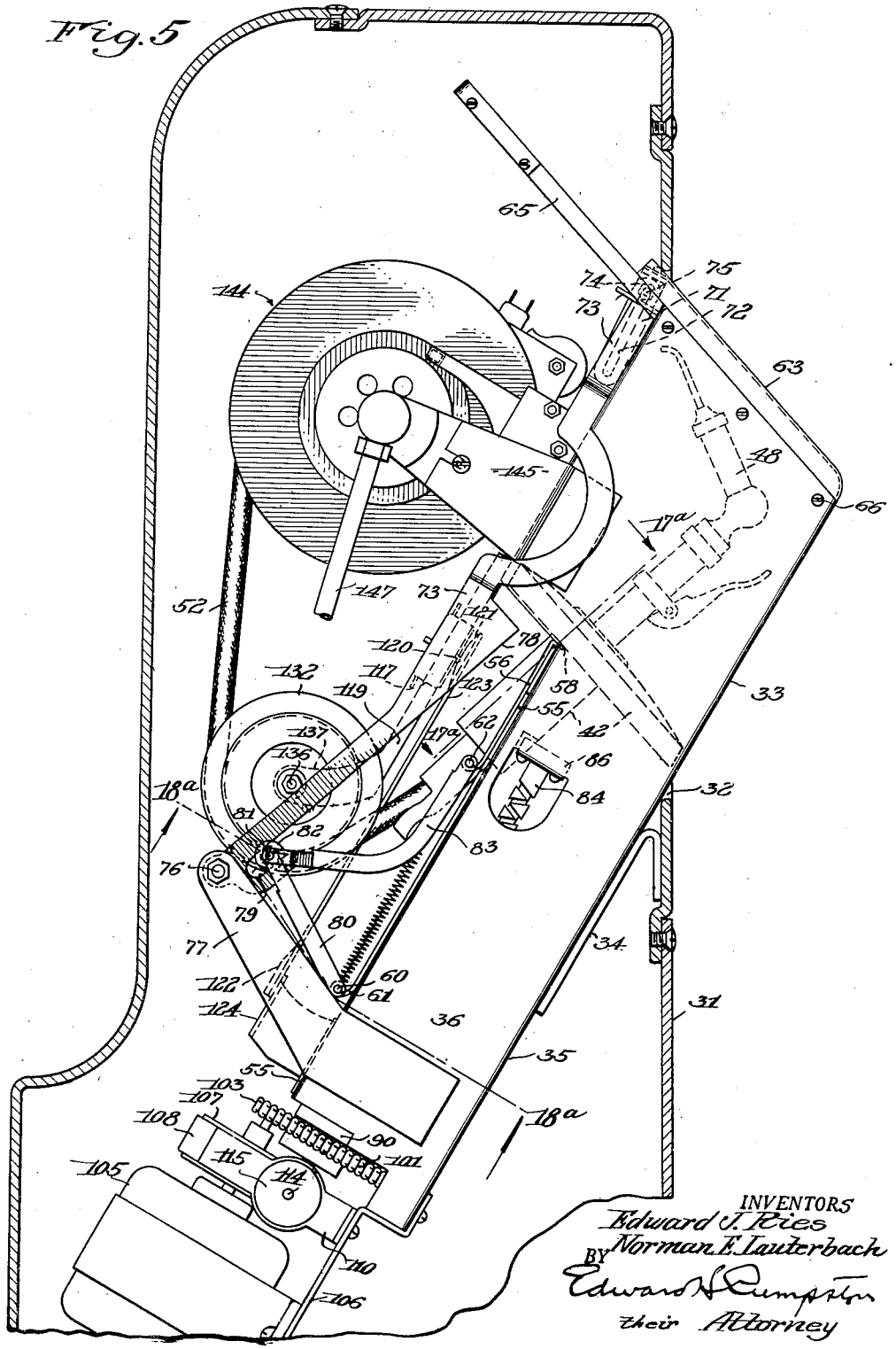
INVENTORS
Edward J. Ries
Norman F. Lauterbach
BY Edward H. Cumpston
their Attorney

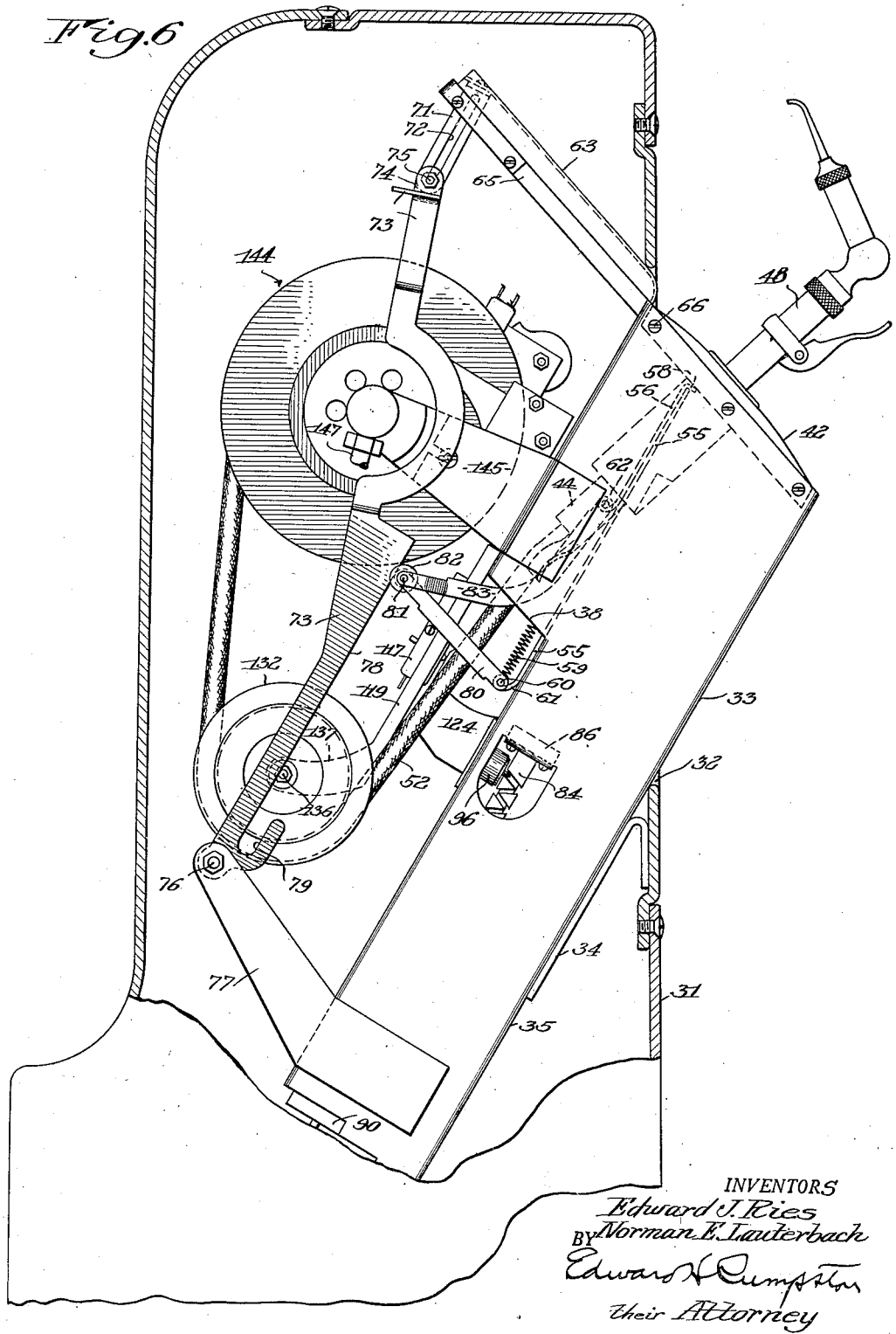

March 7, 1950  E. J. RIES ET AL  2,500,095
EQUIPMENT STAND
Filed March 14, 1945  10 Sheets-Sheet 4
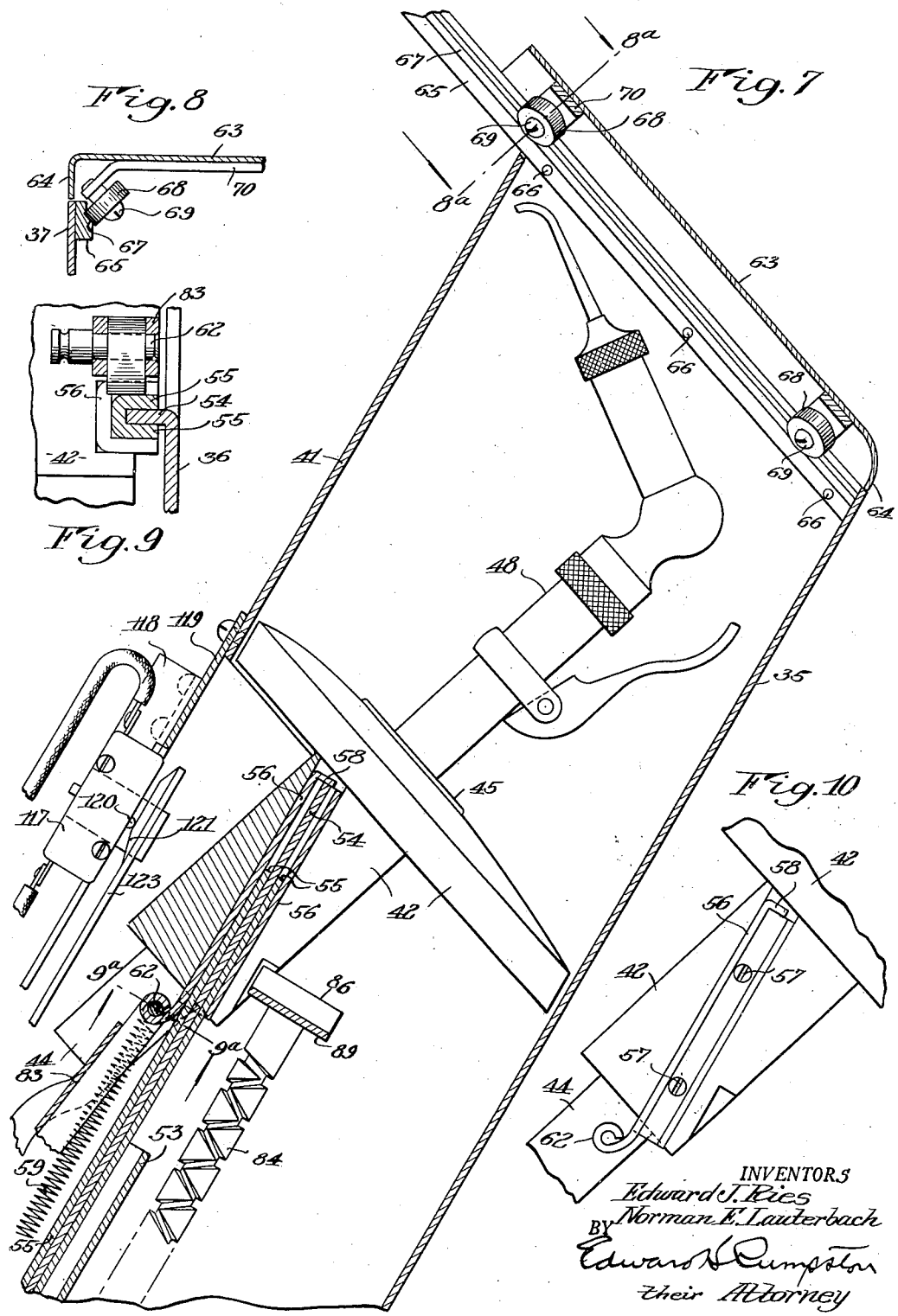

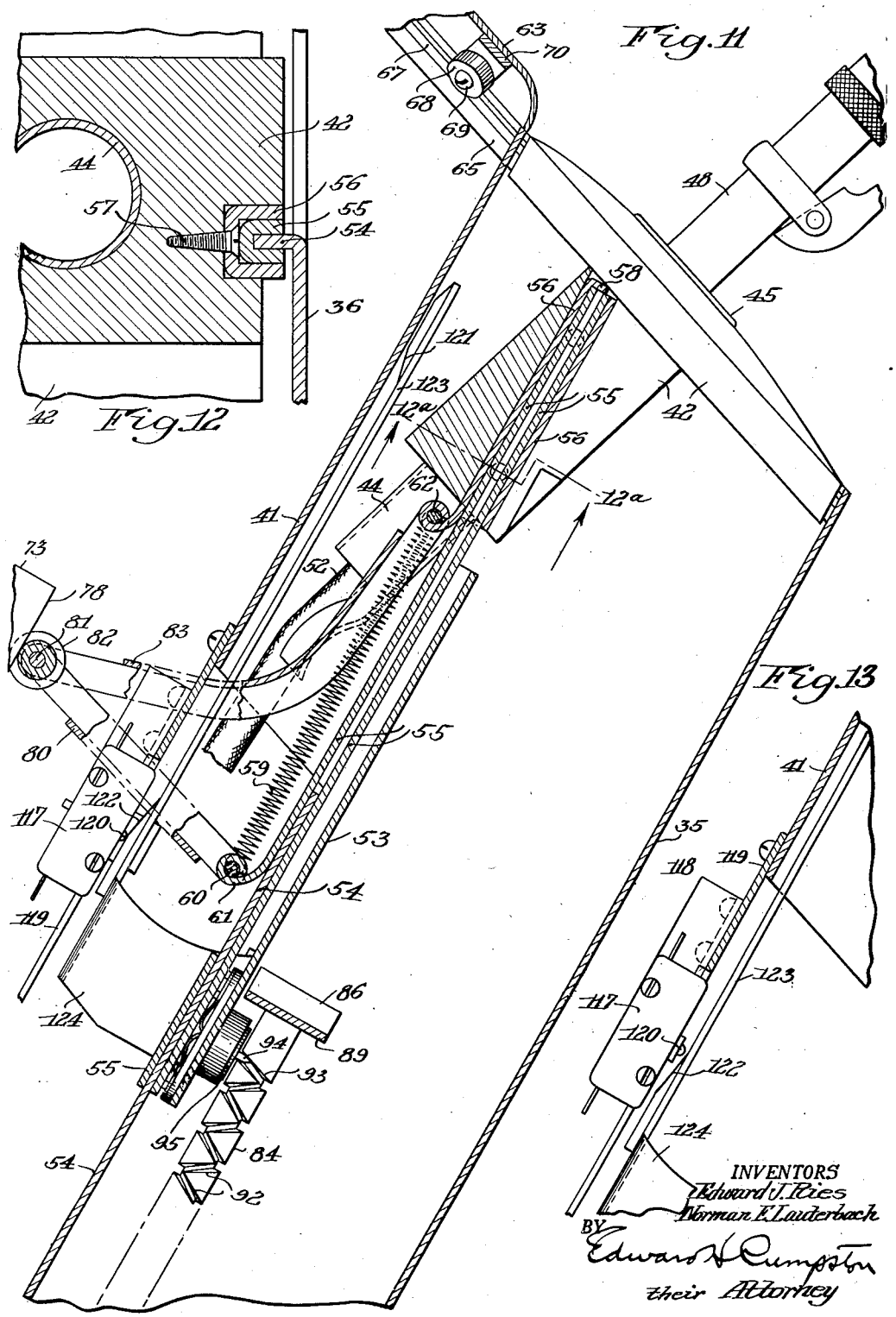

March 7, 1950 E. J. RIES ET AL 2,500,095
EQUIPMENT STAND
Filed March 14, 1945 10 Sheets-Sheet 6
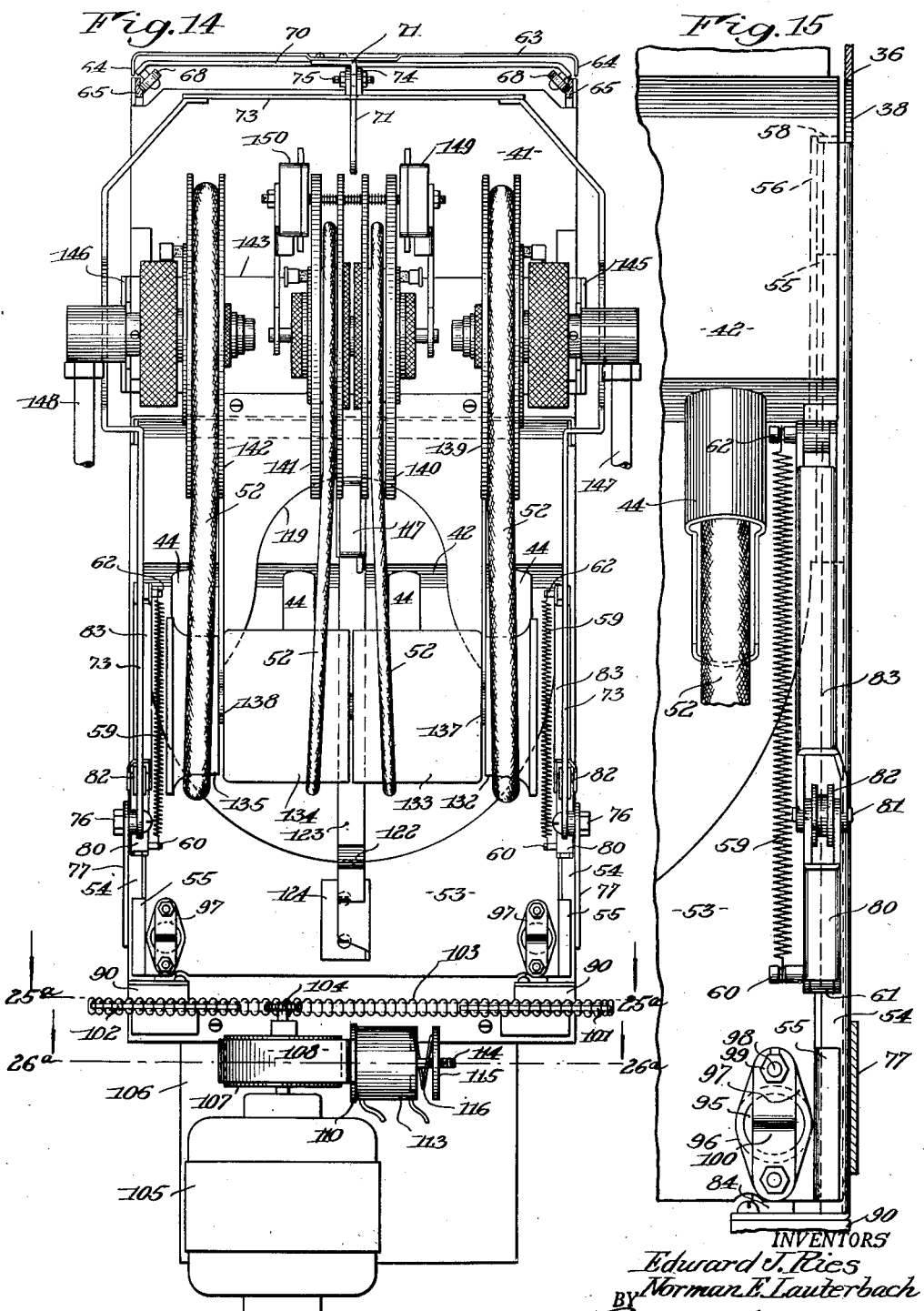
INVENTORS
Edward J. Ries
Norman E. Lauterbach
BY Edward H. Cumpston
their Attorney March 7, 1950     E. J. RIES ET AL     2,500,095
EQUIPMENT STAND
Filed March 14, 1945     10 Sheets-Sheet 7
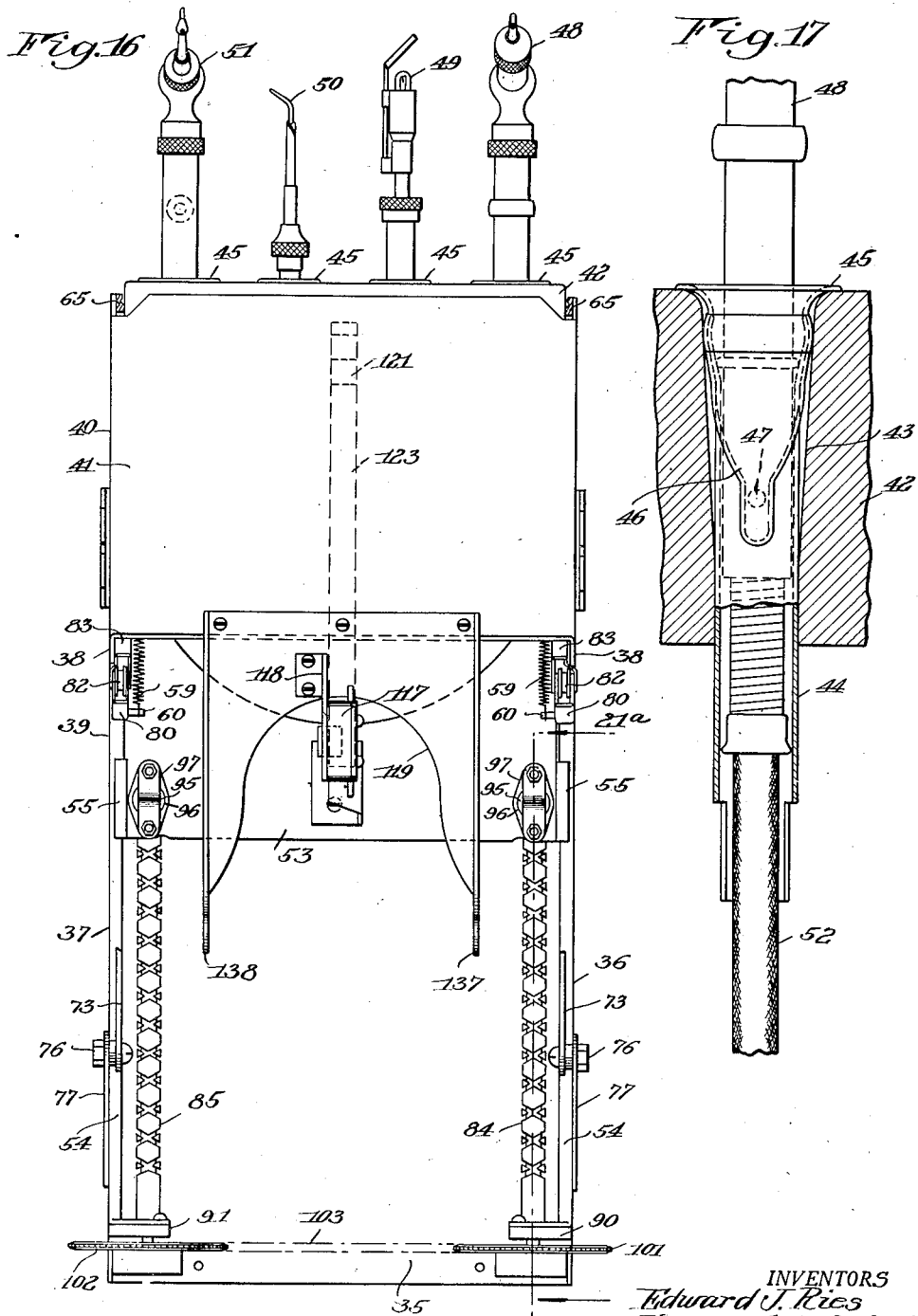
INVENTORS
Edward J. Ries
Norman F. Lauterbach
BY Edward H. Cumpston
their Attorney March 7, 1950 E. J. RIES ET AL 2,500,095
EQUIPMENT STAND
Filed March 14, 1945 10 Sheets-Sheet 8
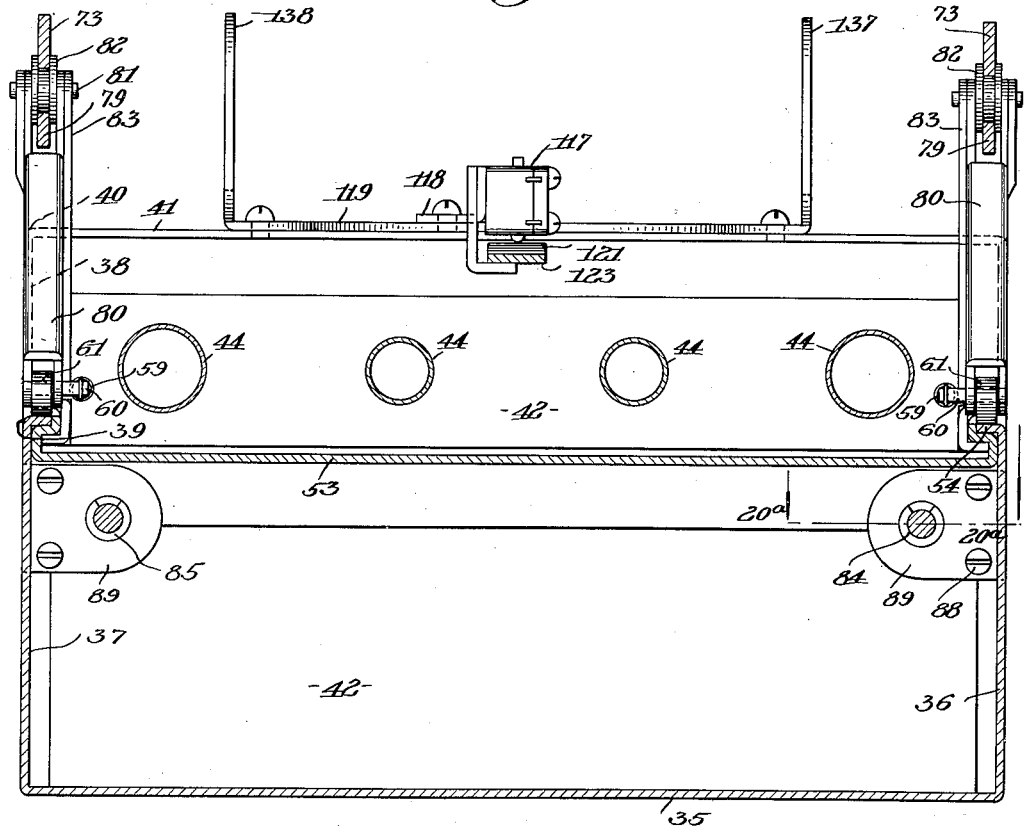
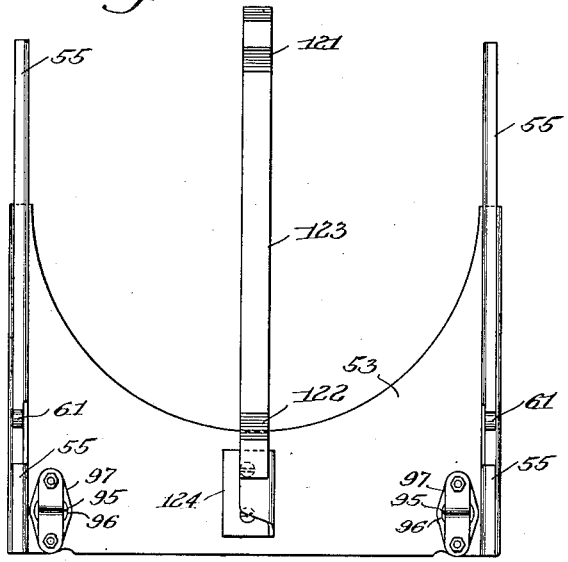
INVENTORS
Edward J. Ries
Norman E. Lauterbach
BY Edward H. Cumpston
Their Attorney

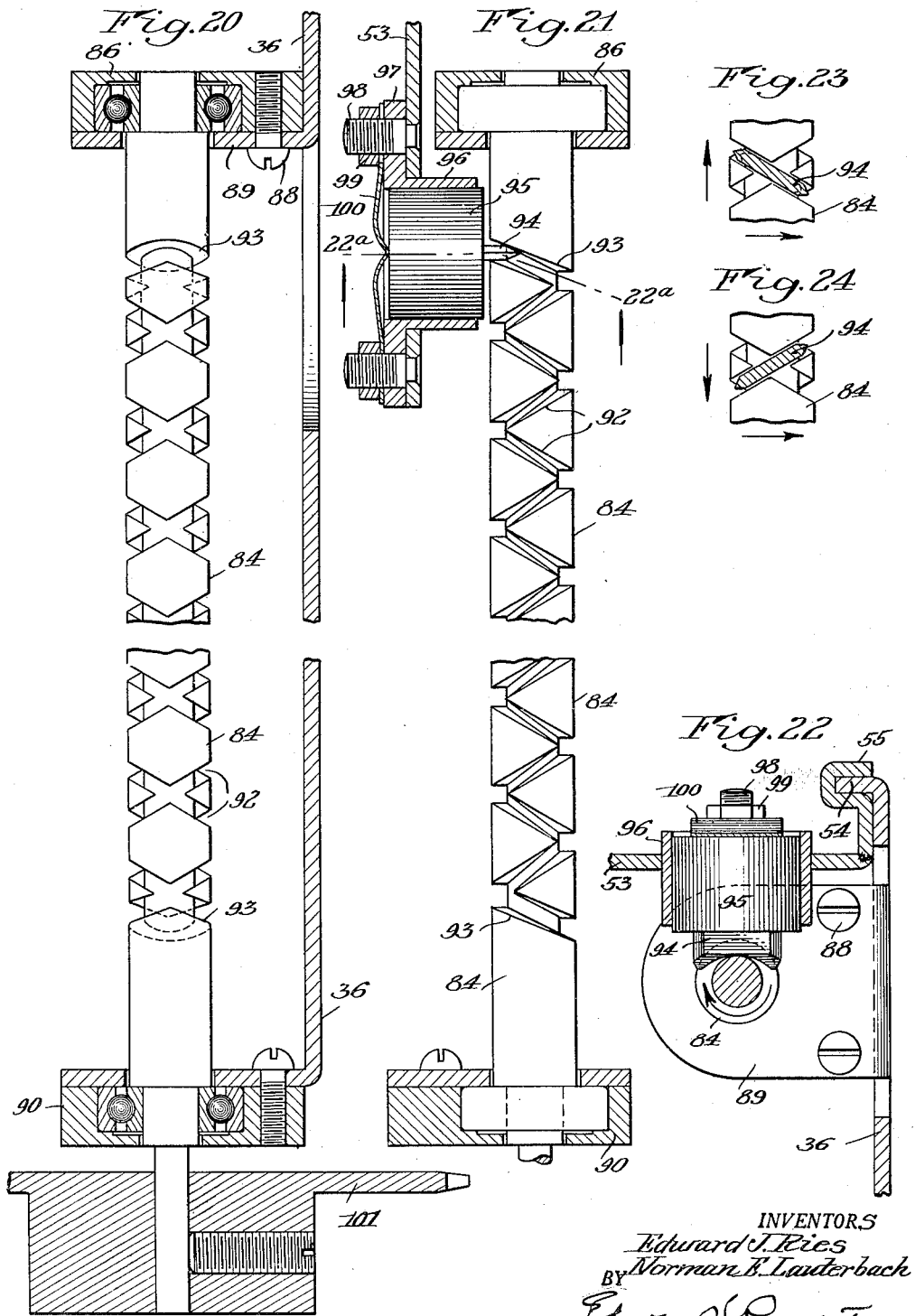

March 7, 1950  E. J. RIES ET AL  2,500,095
EQUIPMENT STAND
Filed March 14, 1945  10 Sheets-Sheet 10
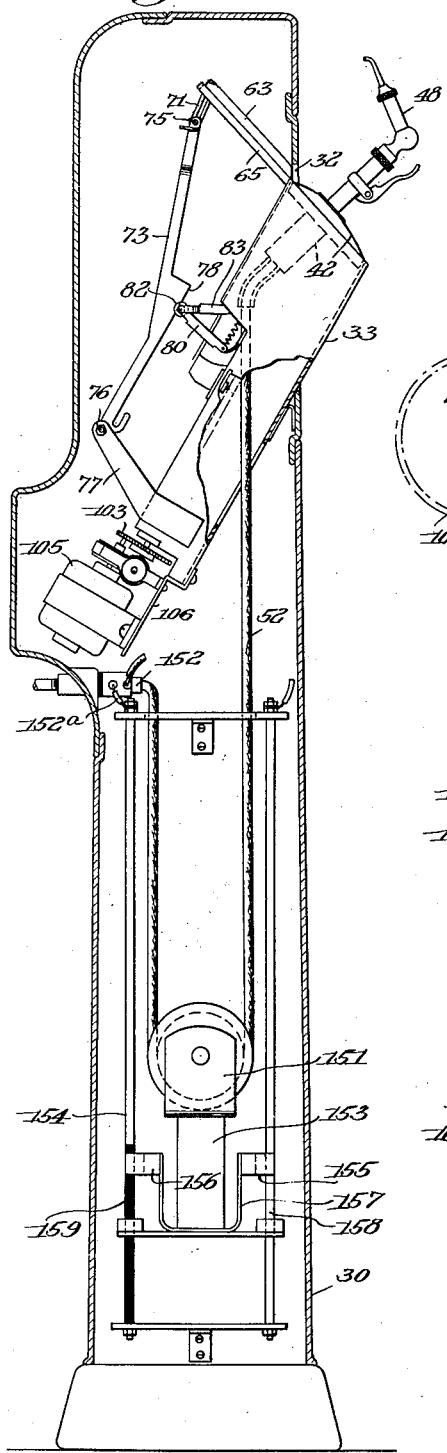
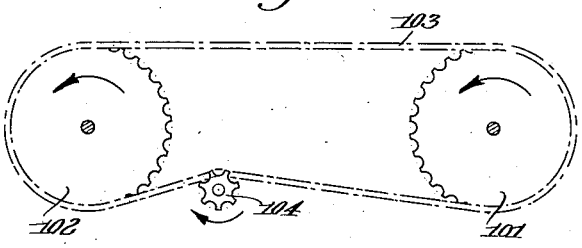
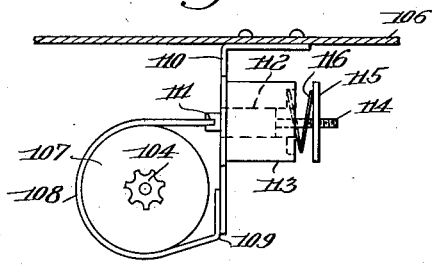
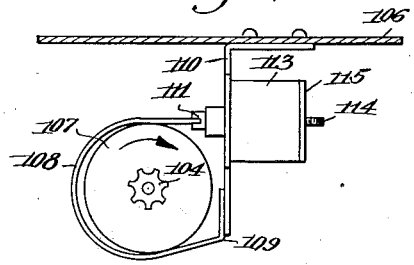
INVENTORS
Edward J. Ries
Norman E. Lauterbach
BY Edward H. Rumpston
Their Attorney Patented Mar. 7, 1950

2,500,095

UNITED STATES PATENT OFFICE 2,500,095

EQUIPMENT STAND

Edward J. Ries, Brighton, and Norman E. Lauterbach, Newark, N. Y., assignors to Ritter Company, Inc., Rochester, N. Y., a corporation of Delaware Application March 14, 1945, Serial No. 582,722

17 Claims. (Cl. 312—22)

This invention relates to equipment stands for supporting dental, medical and like equipment adjacent an operating position, and, more particularly, to the portions of such stands for holding extensible hand instruments so as to be within convenient reach of the operator, one object of the invention being to provide such a stand with improved and more efficient means for holding such instruments.

Another object is the provision of means of the above character so constructed and arranged as normally to completely enclose and protect the instruments from injury and contamination, within the walls of the stand.

Another object is to provide such a stand having convenient means by which the instruments may be projected through an opening in the walls of the stand within easy reach of the operator, so as to be readily accessible for use.

A further object is to afford an improved stand of the nature indicated in which the movable parts for holding and enclosing the hand instruments are motor actuated and conveniently controlled by a simple type of manual switch, so as to require a minimum of effort and attention by the user.

Still a further object is to provide an equipment stand of the above advantageous character having a simple and practical type of construction adapted to be readily manufactured at a relatively low cost.

To these and other ends the invention resides in certain improvements and combinations of parts, all as will be hereinafter more fully described, the novel features being pointed out in the claims at the end of the specification.

In the drawings:

Fig. 1 is a side elevation, partly in section, of a dental equipment stand embodying the present invention and showing the instruments uncovered and advanced for use;

Fig. 2 is a fragmentary elevation of the holders and instruments as viewed from the right in Fig. 1;

Fig. 3 is a circuit diagram showing the starting position of the parts;

Fig. 4 is a similar view showing the parts in running position;

Fig. 5 is an enlarged elevation of the mechanism shown in Fig. 1 in closed position with holder and instruments retracted;

Fig. 6 is a view similar to Fig. 5, but showing the cover retracted and the instruments projected;

Fig. 7 is a further enlargement of parts shown in Fig. 5, detached from the stand pedestal;

Fig. 8 is an enlarged sectional elevation on the line 8a—8a in Fig. 7, showing a detail of the cover;

Fig. 9 is an enlarged sectional view on the line 9a—9a in Fig. 7, showing guide means for the instrument holder;

Fig. 10 is an enlarged elevation of guide means on the instrument holder shown in Fig. 7;

Fig. 11 is an enlarged sectional elevation of parts shown in Fig. 6;

Fig. 12 is an enlarged sectional view on the line 12a—12a in Fig. 11, showing the guide means for the holder;

Fig. 13 is a sectional elevation of parts shown in Fig. 11, but in a different operating position;

Fig. 14 is an elevation of the parts as viewed from the left in Fig. 5, detached from the stand pedestal;

Fig. 15 is an enlarged, fragmentary elevation, partly in section of parts shown in Fig. 14;

Fig. 16 is an elevational view showing the instrument holder, carriage and guide means, detached, with the instruments projected;

Fig. 17 is an enlarged, sectional elevation on the line 17a—17a in Fig. 5;

Fig. 18 is an enlarged, sectional elevation on the line 18a—18a in Fig. 5;

Fig. 19 is a plan view of the carriage detached;

Fig. 20 is an enlarged sectional view substantially on the line 20a—20a in Fig. 18, showing one of the carriage driving spindles detached;

Fig. 21 is an enlarged sectional view on the line 21a—21a in Fig. 16, showing the carriage driving mechanism detached;

Fig. 22 is an enlarged, sectional view on the line 22a—22a of Fig. 21;

Figs. 23 and 24 are fragmentary views showing details of the spindle mechanism in different positions;

Fig. 25 is a diagrammatical view on the line 25a—25a in Fig. 14;

Figs. 26 and 27 are sectional views on the line 26a—26a in Fig. 14, showing the motor brake in different positions, and Fig. 28 is a view similar to Fig. 1, but showing an embodiment with modified means for retracting the flexible conductors or cords of the instruments.

The invention is embodied, in the present instance, by way of illustration, in a dental equipment stand comprising a hollow support, or pedestal, 30, Fig. 1, for supporting and housing the tools and equipment commonly employed in the practice of the dental profession, such as the extensible water and air syringes, exploration lamp, cautery, or other hand instruments, as well understood in the art. The forward wall 31 of the pedestal is preferably formed adjacent its top, however, with an opening 32 closed in part by a slightly projecting upper end of a casing 33, as shown. The casing is otherwise housed within the pedestal and fixed in place therein as by means of brackets 34, Fig. 5. The casing is preferably inclined upwardly and forwardly and is open at its upper end which projects through the front wall of the pedestal, as shown, and is provided with a movable cover as hereafter described.

Casing 33 has a front wall 35 and side walls, 36 and 37, Figs. 16 and 18, the side walls being stepped as at 38 to form lower and upper edges, 39 and 40. The casing is open at its rear between the lower edges 39 and is closed between the upper edges 40 by a rear wall 41, these walls serving to support and partially enclose the mechanism of the present invention.

The instrument holder 42 preferably comprises an upper rectangular head portion fitting the interior of casing 33 and a lower or shank portion, formed integrally of plastic or other suitable material and having therein a row of socket openings, as at 43, Fig. 17, lined with metal tubes 44, the outer ends of which are flared outwardly and flanged, as at 45. The flared end of each tube is preferably formed at one side with a tapered channel or groove 46 adapted to receive a projecting lug 47 on the corresponding instrument handle, to insure the seating of the handle in the socket with the instrument turned in a desired direction. The instruments shown in the present instance comprise a hot air syringe 48, examination lamp 49, cautery 50, and water syringe 51. Each instrument is connected by a flexible conducting element or cord 52 with a source of supply of an operating medium in the pedestal such as a fluid or electrical current, and is provided with reeling or other suitable means for retracting it and its extensible hand instrument for returning the instrument to its socket after being used, as hereafter described and as well understood in the art.

The instrument holder is mounted to reciprocate in the casing toward and from its open upper end, to project the instruments therethrough for accessibility in use and for retracting and projecting the instruments within the casing and pedestal when not in use. The holder is reciprocated by a carriage 53 in the general form of a metal plate (Fig. 19) which also reciprocates in the casing, the holder and carriage and the side walls of the casing being provided with coacting guideways for this purpose, as best shown in Figs. 7, 9, 11 and 12. To this end the edges 39 of the casing side walls 36 and 37 are flanged inwardly, as at 54, and these flanges are slidingly embraced by U-shaped or channel guideways 55 formed on the outer edges of the carriage 53. The ends of the holder 42 are likewise provided with U-shaped guideways 56 slidably embracing the carriage guides 55 so that the carriage slides on the casing and the holder on the carriage, for the purpose of actuating and presenting the upper end of the holder at the upper end of the casing, as shown in Fig. 6.

The carriage is reciprocated by means hereafter described and is connected with the holder to reciprocate it in turn, by means which will now be described. Each guideway 56 of the holder is fixed in a slot in the holder end by means of screws 57, Fig. 10, and the upper end of the guideway is formed with a downwardly turned lip 58 adapted to overlap the guideway 55 of the carriage and the flange 54 of the casing, the lip 58 and flange 54 forming stop means for positively limiting the inward travel of the holder. Outward travel of the carriage, however, brings its guideway 55 into engagement with lip 58 of the holder and moves the holder positively toward the open end of the casing, from the position shown in Fig. 7 to that shown in Fig. 11. The holder is moved in the opposite direction by its weight and by a pair of coiled tension springs 59 each fixed at one end to a pin 60 carried in a keeper bracket 61 struck upwardly from the guideway 55 of the carriage and fixed at its other end to a similar pin 62 struck upwardly from one end of the guideway 56 of the holder, for yieldably retracting the holder against its stop upon retraction of the carriage.

The carriage travels farther inwardly on its guideways than the holder, and this extra travel of the carriage relative to the holder, after the travel of the holder is stopped by its lip 58, is utilized by a linkage connecting the carriage and holder, for reciprocating a sliding cover for the casing opening. The cover, which will first be described, is shown as a plate 63, Fig. 7, having flanged edges 64 meeting with the top edges of the casing opening so as to tightly close it in the outward position of the cover shown in Fig. 7. The cover slides upwardly and rearwardly into the pedestal, when the instrument holder is advanced, as shown in Figs. 6 and 11, by means of cooperating parts on the cover and casing comprising, preferably, a pair of track bars 65 fixed to the side walls of the casing as by means of rivets 66, Fig. 7. Bars 65 are grooved, as at 67, to form tracks for rollers 68 rotatably mounted in pairs on opposite sides of the cover by means of journals 69 on brackets 70 fixed on the cover, so that the cover can be slid rearwardly and upwardly, as shown in Fig. 6, to allow the hand instruments to be projected through the opening in the top of the casing, and forwardly and downwardly to the position shown in Fig. 7, to close the casing opening when the instruments are retracted.

The means for actuating the cover preferably comprises an arm 71, Fig. 6, fixed on the inner end of the cover and formed with a longitudinal slot 72. A bail 73 on the rear side of the casing has a central portion extending transversely of arm 71, and spaced lugs 74 on the bail carry a pin 75 sliding in the slot 72 on the arm. The other ends of the side arms of the bail 73 are pivotally mounted on pins 76 fixed in the ends of brackets 77 secured to the side walls 36 and 37 of the casing. The under side of each arm has a straight track portion 78 which is reversely bent adjacent the pivot to provide an opposed track portion 79, for actuation by a roller on linkage means connecting the carriage and holder, as hereafter described.

The linkage between the carriage and holder comprises, preferably, a link 80 of U-shaped cross section formed with spaced bearing lugs pivotally mounted on the pin 60 in the bracket 61 struck upwardly from the guideway 55 on the carriage as described above and shown in Figs. 5, 15 and 18. Link 80 has similar spaced lugs at its upper end carrying a pin 81 on which a grooved roller 82 is rotatably mounted between the lugs of the link. Pivotally connected with the outer ends of the pin are spaced lugs of a link 83 of U-shaped cross section having at its opposite end a pair of spaced bearing lugs pivotally mounted on the pin 62 carried by the rear end of the guideways of the holder. As the carriage is advanced from the position shown in Fig. 5, it moves the lower end of each link 80 toward the stationary holder, with the result that link 83 is turned about its pivot 62 and roller 82 is raised and moved upwardly in engagement with the bottom edge of the corresponding arm of bail 73, so that the bail is raised to slide the cover rearwardly and upwardly to the position shown in Fig. 6 in which the upper end of the casing is uncovered. The carriage in its continued movement then engages and advances the holder to project the instruments for use. When moved in the opposite direction, the carriage first retracts the holder against its stop, and continued retraction of the carriage moves link 80 away from link 83, moving roller 82 rearwardly and downwardly so that it engages the opposite track portion 79 and swings the bail downwardly toward the casing, thereby sliding the cover over the casing opening, as shown in Fig. 5.

The means for reciprocating the carriage comprises, preferably, a pair of threaded spindles, 84 and 85, Figs. 16, and 20 to 22, inclusive, one adjacent each side wall of the casing. Each spindle is mounted at its upper end, Fig. 6, in a ball bearing 86, 87, fixed by screws 88 to lugs 89 struck inwardly from the sides of the casing. The opposite ends of the spindles are mounted in ball bearings, 90, 91, carried by similar lugs struck inwardly from the side walls of the casing.

Each spindle is formed with a double thread 92 of opposite hand, as shown, the two threads being joined at each end of the spindle adjacent an inclined cam surface 93. Engaged with the spindle threads is a bevelled follower 94, Figs. 21 to 24, inclusive, fixed on a cylindrical plug 95 rotatably supported in a bearing 96 on a plate 97 secured on the carriage 53, as by means of threaded studs 98 on the carriage projecting through openings in plate 97 which is clamped in place by means of nuts 99 on the studs. Between the nuts and plate is a leaf spring 100 shaped to bear centrally on the oscillating plug 95 to hold its follower 94 in the threads of the spindle.

As each spindle is rotated, by means hereafter described, its follower 94 is moved by engagement with one of the threads and moves the carrier in the direction of the thread until the follower reaches the end of the thread and engages the cam surface 93 of the spindle which turns the follower for engagement with the other thread of opposite hand for moving the carriage in the opposite direction. As the spindles are rotated continuously in the same direction, they produce a reciprocating movement of the carriage, automatically reversing its direction of movement upon reaching the end of its path of travel, and the pair of spindles move the carriage at both sides uniformly without frictional twisting in its guides.

The means for rotating the spindles 84 and 85 comprises sprocket gears 101 and 102, Figs. 14, 20 and 25, fixed on the projecting lower ends of the spindles and connected by a sprocket chain 103. Meshing with the chain between the sprockets is a sprocket pinion 104, fixed on the shaft of an electric motor 105 mounted on an extension 106 of the casing. The motor shaft has fixed thereon a brake drum 107, Fig. 14, engaged by a brake band 108, Figs. 26 and 27, one end of which is fixed at 109 to a bracket 110 on the casing. The other end of the brake band is attached at 111 to the movable core 112 of a solenoid coil 113. The core has a projecting rod 114 on which a plate 115 is threadedly and adjustably mounted and a coiled compression spring 116 is interposed between plate 115 and the end of the solenoid so as to draw the brake band into frictional engagement with the drum and brake and stop the motor shaft and the parts driven thereby. The solenoid is connected in a circuit, energized by means hereafter described, to move the core against the tension of the spring and relieve the tension on the band 108 to release the brake so long as the circuit is energized.

The electric circuit of the motor is controlled by automatic and manual switch means for manually starting the operation of the motor and automatically stopping it as the carriage reaches the opposite ends of its travel. The automatic switch means preferably comprises a normally closed, quick-acting spring switch such, for example, as the commercially available type known as a "Switchette." Such a switch is shown at 117, Figs. 3, 4, 7, and 16, mounted on an arm 118 on a bracket 119 on the rear wall 41 of the casing. The switch has a spring advanced plunger 120 adapted to be engaged for opening the switch by spaced cam surfaces, 121 and 122, on an arm 123 fixed on a post 124 on the lower end of the carriage, as best shown in Fig. 19. The cam surfaces 121 and 122 are so positioned as to engage the switch plunger 120 in each of the exreme positions of the carriage (Fig. 3) with the switch in open position, but so as to release the plunger and allow the switch to close shortly after the commencement of the carriage motion in each direction (Fig. 4).

The circuit includes also a manually operable switch 125, so positioned in the circuit that its closing serves to bridge the automatic switch 117 and initiate rotation of the motor. As shown diagrammatically in Figs. 3 and 4, a connection 126 from a source of voltage is connected to one of the leads 127 of the automatic switch and one of the leads 128 of the hand switch. The opposite leads of the switches are both connected to one terminal 129 of the motor 105, the opposite terminal 130 of which is connected, as at 131, with the ground. The solenoid 113 is connected from the motor terminal 129 to the ground.

With the carriage at the inner end of its path of movement and the instruments retracted and covered, the parts occupy the position shown in Figs. 3 and 7, the automatic switch 117 having been opened by the cam surface 121. Upon closure of the manual switch 125, thus bridging the automatic switch, the source of voltage is connected with the motor which is rotated to move the carriage. A slight outward movement of the carriage causes cam surface 121 to clear the switch plunger 120 (Fig. 4) and allow the switch to close so that the manual switch can then be released without stopping the movement of the carriage. Upon reaching its upper or outer position, the cam surface 122 is moved to depress the switch plunger 120, thereby opening the switch and stopping the movement of the parts pending subsequent closing of the manual switch and the return of the carriage to its inner position. When the circuit is opened at either end of the movement, the solenoid 113 is deenergized and allows spring 116 to apply the brake band and stop the motor without over travel. The manual switch may obviously have any suitable and convenient form such as a push button 125a conveniently located on a wall of the pedestal, or a more sanitary foot actuated switch (not shown) at the pedestal base.

The flexible conductors 52 for the instruments are preferably carried about pulleys, as 132 to 135, inclusive, Figs. 5, 6, and 14, rotatably mounted on a spindle 136 mounted in spaced arms, 137 and 138, of the bracket 119 fixed on the back wall of the casing. The larger syringe conductors for water and air as well as current, pass around grooved pulleys 132 and 135, while the electrical cords for the other instruments pass around cylindrical pulleys 133 and 134. From the idler pulleys 132 to 135, inclusive, the conductors pass to a series of spring reels, 139 to 142, inclusive, forming part of a reel assembly, indicated generally at 144, Fig. 5, mounted on arms, 145 and 146, supported on the casing. The reel assembly includes connections from the flexible conductors to sources of operating media in the pedestal, such as the water and air connections, 147 and 148, respectively, and the electrical leads, 149 and 150, connected to a voltage source, the spring reels being adapted to rewind the flexible conductors and return the instruments to their sockets after use, as well understood in the art. This reeling assembly, however, forms no part of the present invention, being described and claimed in the copending application of Edwin J. Wester and Eugene R. Ziegler, Serial No. 582,620, filed Mar. 14, 1945, now Patent No. 2,438,082, dated March 16, 1948.

Instead of the reeling assembly referred to above, the flexible conductors may, if desired, be carried downwardly in the pedestal, as shown in Fig. 28, and looped about pulleys as 151 and thence carried to a connection with a series of operating media, such as a water connection shown at 152 and an electrical connection 152a. The pulley 151 of each conductor is rotatably mounted on a carriage 153, sliding vertically on guide rods 154, which are included in the electrical circuit and connected with each other through brushes, 155 and 156, on an insulated conductor 157 on the carriage 153. The lower end of the guide rods 154 are coated with insulating material, as at 158 and 159, to break the circuit when the instruments are retracted by the weight of the carriage 153 on the conductor loops, as more fully described in Patent No. 2,328,924, dated Sept. 7, 1943, but forming no part of the present invention.

The operation of the mechanism has been described above in connection with the description of its various parts and it is apparent that the hand instruments, when not in use, are all retracted, housed and protected from injury and contamination within the pedestal. Momentary closing of the hand switch starts the motor and closes the circuit through the automatic switch, so as to continue operation of the motor and thereby automatically uncover the pedestal opening and project the hand instruments from the pedestal in position to be conveniently grasped and extended for use by the dental practioner. The parts are stopped and retained in this position by the automatic switch and brake and when the use of the equipment has been completed, another momentary closing of the manual switch automatically starts the motor, retracts all of the hand instruments within the pedestal and closes the pedestal opening so as to afford them complete protection. Such operations are accomplished quickly and with a minimum of attention and effort on the part of the operator. The construction and arrangement of the parts is simple and practical in character and capable of being manufactured at a relatively low cost.

It will thus be seen that the invention accomplishes its objects and while it has been herein disclosed by reference to the details of preferred embodiments, it is to be understood that such disclosure is intended in an illustrative rather than a limiting sense, as it is contemplated that various modifications in the construction and arrangement of the parts will readily occur to those skilled in the art, within the spirit of the invention and the scope of the appended claims.

We claim:

1. An equipment stand comprising a hollow support formed with an opening, an instrument holder mounted in said support for reciprocating movements toward and from said opening, motor means on said support having a connection with said holder to move the same, an electric circuit including the motor of said motor means, a manually operable switch on said support and included in said circuit for energizing said motor means to initiate movement of said holder, and a second switch in said circuit, said motor means including a part actuated by said motor to operate said second switch and automatically stop said holder at the end of each of said reciprocating movements thereof.

2. An equipment stand comprising a hollow support formed with an opening, an instrument holder mounted in said support for reciprocating movements toward and from said opening, a motor on said support having means connected with said holder to move the same, an electric circuit including said motor, a normally open switch in said circuit, means actuated by said motor for closing said switch and for subsequently opening the same to automatically stop said holder at the end of each of said reciprocating movements thereof, and a manually operable swtch for bridging said normally closed switch and initiating operation of said motor.

3. An equipment stand comprising a hollow pedestal formed with an opening in a side wall and below the top thereof, a cover slidably mounted on said pedestal to slide across said opening to alternately open and close said opening, an instrument holder mounted in said pedestal for reciprocating movement to and from position to present an instrument for access at said opening, electrical motor means on said support, actuating connections from said motor means to said cover and holder for alternately uncovering said opening and advancing said holder and for retracting said holder and closing said opening, and switch means for controlling the operation of said motor.

4. An equipment stand comprising a support, an instrument holder movable on said support alternately in opposite directions between operative and inoperative positions, a motor having a continuous direction of movement, a part having means connecting the same with said motor and operating to drive said part alternately in opposite directions, means connecting said part with said holder to move the same, manually operable means for energizing said motor to initiate movement of said holder from one of said positions to the other thereof, and means actuated by said motor for automatically deenergizing the same and terminating movement of said holder at each of said positions.

5. An equipment stand comprising a support, an instrument holder movable on said support alternately in opposite directions between operative and inoperative positions, a motor, an element, means connecting said element and motor for rotating said element in a single direction, said element being formed with coextensive threads of opposite hand, a part having means connecting the same with said holder and provided with follower means to engage said threads alternately and move said holder in opposite directions, manually operable means for energizing said motor to move said holder from one of said positions to the other thereof, and means actuated by said motor for automatically deenergizing the same and stopping said holder at each of said positions.

6. An equipment stand comprising a support, an instrument holder movable on said support alternately in opposite directions between operative and inoperative positions, a motor, an element, means connecting said element and motor for rotating said element in a single direction, said element being formed with coextensive threads of opposite hand connected with each other at opposite ends of said element, a follower for engagement with said threads, said element being formed with a portion at each end thereof for automatically directing said follower from one of said threads to the other thereof during the rotation of said element, a connection between said follower and holder for moving said holder alternately in opposite directions, and switch means for starting and stopping said motor.

7. An equipment stand comprising a hollow support formed with an opening, a cover movable on said support between positions for opening and closing said opening, respectively, an instrument holder movable in said support between positions located at and spaced from said opening, respectively, motor means on said support connected with said cover and holder for moving the same between said positions thereof, an electric circuit including the motor of said motor means, switch means actuated automatically by said motor means for opening and closing said circuit as said cover and holder move toward and from said positions thereof, switch means for closing and opening said circuit to initiate movement of said cover and holder from one of said positions toward the other thereof, and brake means operated by the opening of said circuit for stopping said cover and holder in said positions.

8. An equipment stand comprising a hollow support formed with an opening, a cover movable into and out of said support to alternately open and close said opening, an instrument holder mounted for alternate movements to and from position within said support to present an instrument for access at said opening, motor means on said support having connections with said cover and holder and operating alternately to uncover said opening and advance said holder and to retract said holder and close said opening, an electric circuit comprising manually operable switch means for energizing said motor means to initiate each of said alternate operations thereof, and control means in said circuit for automatically deenergizing said motor means at the end of each of said operations thereof.

9. An equipment stand comprising a hollow support formed with an opening, a cover movable into and out of said support to open and close said opening, an instrument holder movable between operative and inoperative positions within said support, motor means connected with said cover and holder and operating alternately to uncover said opening and move said holder to operative position and to move said holder to inoperative position and close said opening, an electric circuit including the motor of said motor means, switch means actuated automatically by said motor means to open and close said circuit as said holder is moved toward and from one of said positions, and manually operable switch means for closing said circuit to initiate movement of said holders from one of said positions toward the other thereof.

10. An equipment stand comprising a hollow support formed with an opening, a cover movable on said support to open and close said opening, an instrument holder movable in said support to present an instrument at said opening, a carriage movable in said support independently of said holder and having means for effecting said movement of said holder, motor means for moving said carriage, and means connecting said carriage and cover for effecting said movement of said cover during movement of said carriage independently of said holder for moving said cover in timed relation with said holder.

11. An equipment stand comprising a hollow support formed with an opening, a cover movable on said support to open and close said opening, an instrument holder movable in said support to present an instrument at said opening, a carriage movable in said support, motor means for moving said carriage, connections between said carriage and holder for moving said holder through one portion of the movement of said carriage, links pivotally connected to said carriage and holder, respectively, and to each other, and means actuated by said links for moving said cover in timed relation with said holder during another portion of the movement of said carriage.

12. An equipment stand comprising a hollow support formed with an opening, a cover movable on said support to open and close said opening, an instrument holder movable in said support to present an instrument at said opening, a carriage movable in said support, cooperating parts on said carriage and holder for moving said holder positively in one direction during a portion of the movement of said carriage, resilient means connecting said carriage and holder for moving said holder in the opposite direction during another portion of the carriage movement, motor means for moving said carriage, link means connecting said carriage and holder actuated by relative movement therebetween, and a connection between said link means and cover for moving said cover in timed relation with said holder.

13. An equipment stand comprising a hollow support formed with an opening, a cover movable on said support to open and close said opening, guideways in said support, an instrument holder reciprocating on said guideways toward and from said opening, a stop for said holder, a carriage reciprocating on said guideways, a tension spring connecting said carriage and holder for moving said holder in one direction against said stop and permitting independent movement of said carriage, coacting parts on said carriage and holder for moving said holder in the opposite direction during a portion of the movement of said carriage, motor means for moving said carriage, links connecting said carriage and holder and actuated by the independent movement of said carriage, and means actuated by said links for moving said cover.

14. An equipment stand comprising a hollow support formed with an opening, a cover movable on said support to open and close said opening, an instrument holder movable in said support toward and from said opening, motor means for moving said holder, an electric circuit including the motor of said motor means, switch means in said circuit for controlling said motor means, a lever pivoted on said support and connected with said cover, and means connected with said holder for moving said lever and cover in timed relation with the movement of said holder.

15. An equipment stand comprising a hollow support formed with an opening, a cover movable on said support to open and close said opening, an instrument holder movable in said support toward and from said opening, a motor on said support, a carriage movable in said support, means connecting said motor with said carriage and holder for moving said carriage with said holder and also relatively thereto, means connecting said cover with said carriage and holder and actuated by said relative movement of said carriage for moving said cover in timed relation with the movement of said holder, an electric circuit including said motor, switch means in said circuit, and means on said carriage for actuating said switch means.

16. An equipment stand comprising a hollow pedestal having an opening in a wall thereof, an instrument holder having an instrument therein and mounted in said pedestal for reciprocating movement to and from position to project said instrument through said opening, a cover movable on said pedestal relative to said holder to open and close said opening, electrical motor means in said pedestal, actuating connections from said motor means to said cover and holder for moving the same to alternately uncover said opening and advance said holder and to retract said holder and close said opening, and switch means for controlling the operation of said motor.

17. An equipment stand comprising a hollow pedestal formed with an opening in a side wall below the top thereof, an instrument holder having an instrument projecting therefrom and movable in said pedestal toward and from operating position for projecting said instrument through said opening, a cover movable on said pedestal relative to said holder to open and close said opening, electrical motor means in said pedestal, actuating connections from said motor means to said cover and holder for effecting movements thereof for alternately uncovering said opening and advancing said holder and for retracting said holder and closing said opening, manually operable switch means on said pedestal for energizing said motor means, and switch means in said pedestal actuated automatically by said motor means for deenergizing the same.

EDWARD J. RIES.
NORMAN E. LAUTERBACH.

REFERENCES CITED

The following references are of record in the file of this patent:

UNITED STATES PATENTS

| Number | Name | Date |
| --- | --- | --- |
| 665,678 | Hafgar | Jan. 8, 1901 |
| 1,665,156 | Albers | Apr. 3, 1928 |
| 1,900,009 | Christenson | Mar. 7, 1933 |
| 2,087,654 | Pieper | July 20, 1937 |
| 2,288,822 | McCarron | July 7, 1942 |